May 15, 1951    C. E. EARLE ET AL    2,552,543
COUPLING
Filed April 3, 1950

INVENTORS
CLARENCE E. EARLE
AND CARL A. COVINGTON,
BY Raymond Wheaton
ATTORNEY

Patented May 15, 1951

2,552,543

UNITED STATES PATENT OFFICE 2,552,543

COUPLING

Clarence E. Earle, Washington, D. C., and
Carl A. Covington, Alexandria, Va.

Application April 3, 1950, Serial No. 153,556

16 Claims. (Cl. 285—168)

This invention relates to couplings, and particularly to couplings which are quickly connected and disconnected, wherein a latching action is effected as the cooperating parts are relatively moved towards one another.

Whereas couplings of automatic and semi-automatic types have been proposed previously, the present invention presents marked improvements over the prior art structures from the standpoints of cost, simplicity, compactness, and strength, particularly in shear.

It is among the objects of this invention to provide a coupling comprising a socket forming member, a detent and a detent actuating sleeve carried by the member, a detent operator housed within the member, a sleeve displacing element carried by the operator, and a plug member received in the socket and retained therein by the detent, the plug member providing an abutment engageable with the operator when the members are coupled to actuate the detent. The detent operator is preferably provided with means biasing it in one direction, and the plug member serves to overcome such biasing means and confine the detent when the members are coupled. A cam carried by the sleeve serves for engagement with the detent, the cam preferably assuming an annular form integral with the sleeve, and the detent being satisfactorily defined by a plurality of radially displaceable balls received in frusto-conical pockets penetrating the wall of the socket forming member.

The coupling is preferably provided with means biasing the operator towards a limiting position and the sleeve towards the detent, which may assume the form of a spring interposed between the member and operator on the one hand and a spring interposed between the sleeve and operator on the other. These springs may be concentrically arranged compression springs, which are arranged in separate chambers in order that there will be no possibility of the springs becoming interentangled. The plug member preferably provides a detent receiving recess to receive the detent upon registry therewith. Whereas in some instances, an intermediate portion of the plug may engage the operator, the leading end of the plug will appropriately provide the abutment. With the parts in coupled relationship, the sleeve is movable towards the plug member to release the detent and produce a tendency to eject the plug member from the socket member.

The detent actuating sleeve is preferably reciprocable with respect to the member, and the detent operator is likewise preferably reciprocable with respect to the member, and the sleeve displacing element may assume the form of a radially disposed pin projecting through the socket forming member into the path of the sleeve for engagement with the sleeve. The detent operator is not only housed within the socket forming member, but is preferably in a definitely spaced relationship with respect to the plug receiving end of the socket member.

The plug member preferably provides a skirt portion to receive and embrace the end of the socket forming member to sustain loads imposed by bending and shear.

A more complete understanding of the invention will follow from a detailed description of the accompanying drawings wherein.

Figure 3:
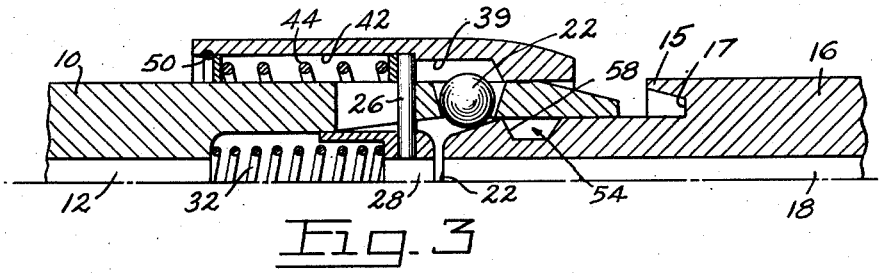
Figure 4:
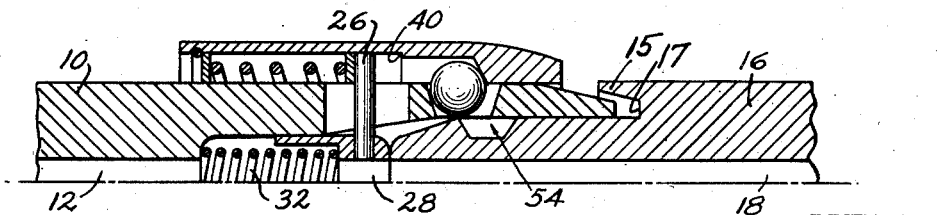

Fig. 3 is a fragmentary sectional elevation showing the coupling members in the relative positions which they assume at an intermediate phase of a coupling operation; and Fig. 4 is a fragmentary sectional elevation depicting the relationship of the coupling members at a more advanced stage of a coupling operation than that shown in Fig. 3, just before the detent is advanced to its plug retaining position.

Figure 2:
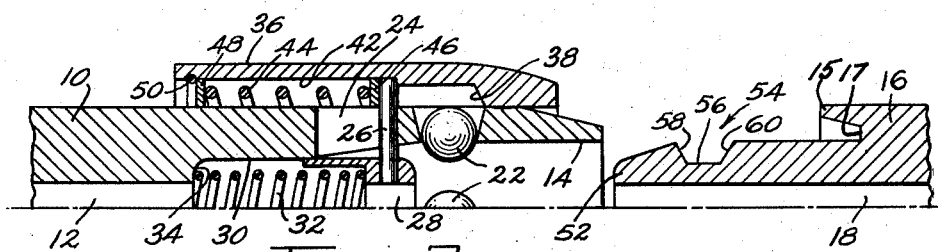
Fig. 2 is a fragmentary sectional elevation depicting the members in separated relationship.

The socket member 10 containing a bore 12 provides a plug receiving end 14 for reception of a plug 16 containing a bore 18. The plug is provided with a skirt portion 15 defining an annular groove 17 to receive and embrace the end of the socket member 10 and sustain such shear and bending loads as may be imposed upon the coupling. Near the plug receiving end of the socket member, but spaced therefrom, a plurality of radially divergent pockets 20 are formed through the wall of the socket member to receive a corresponding number of detent balls 22. These balls are of such diameter that they will not pass inwardly through the socket member when the plug has been withdrawn, as depicted in Fig. 2. Spaced from the ball receiving pockets, the socket forming member is provided with a plurality of slots 24 penetrating its wall for penetration of a similar number of pins or sleeve displacing elements 26, carried by a detent operator 28 which is reciprocable in a reduced bore 30 formed within the socket member. The detent operator 28 is biased towards the plug receiving end of the socket member by means of a compression spring 32 interposed between a shoulder 34 of the socket member and the proximate wall of the detent operator.

Surrounding the socket forming member 10 and reciprocable thereon, is a detent actuating sleeve 36 providing a cam surface 38 for confining the detent balls, a shoulder 40, Fig. 4, serving as an abutment for the sleeve displacing element or pin 26, and a counter bore 42 which receives a spring 44 interposed between a ring 46 bearing against the end of the pin or pins 26 and a ring 48 held within the counter bore by means of a split retaining ring 50.

The plug member 16 provides a reduced leading end 52, and an intermediate annular groove or recess 54 defined by a bottom wall 56 and inclined side walls 58 and 60. It is this groove or recess which receives the detent or detents when the members are coupled to retain them in assembled relationship.

With the parts of the coupling in the positions depicted in Fig. 2, which positions would exist prior to a coupling operation, the plug member 16 will be introduced into the plug receiving end 14 of the socket member 10 until the reduced end or nose 52 of the plug moves the balls 22 outwardly as shown in Fig. 3, further advancement of the plug causing the balls to assume the position depicted in Fig. 4, restraining the sleeve 36 against movement to the left. As viewed in Fig. 3, the leading end of the plug member is approaching the proximate end of the detent operator 28, which it ultimately engages, and as viewed in Fig. 4, the detent operator is shifted towards the left against the force of its compression spring 32, thereby moving the sleeve displacing elements or pins 26 towards the left against the ring 46 to compress the spring 44, whose opposite end bears upon the ring 48, biasing the sleeve 36 towards the left, as depicted in Fig. 4. Then, as the plug member is advanced to an even greater extent than that depicted in Fig. 4, the groove or recess 54 registers with the balls 22, which are then forced inwardly by the cam surface 38 of the sleeve 36 as the sleeve now moves to the left, being no longer restrained by the balls which had been imposed in its path. Thus, the parts will assume positions such as those depicted in Fig. 1, representing a coupled relationship of the cooperating members.

Figure 1:
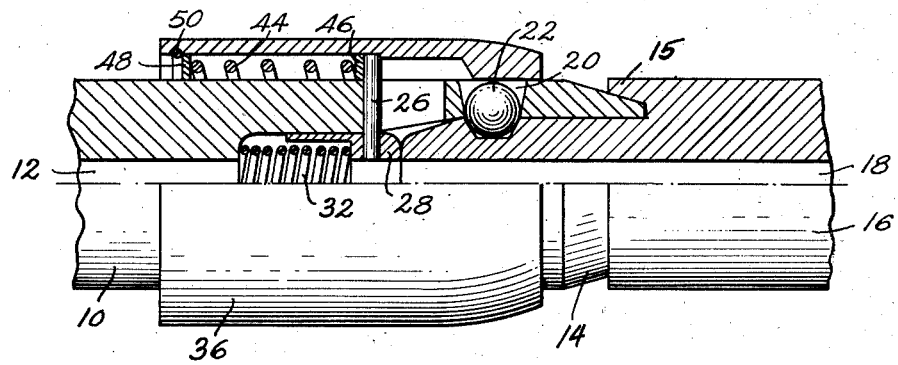
Fig. 1 is a fragmentary elevation, partially in section, showing the members in coupled relationship.

When the members are to be disengaged, the sleeve 36 will be shifted from the position shown in Fig. 1, towards the right, or in other words, towards the plug member, until the bore 39, adjacent the cam surface, registers with the balls. This movement of the sleeve towards the right compresses the spring 44 which imposes a force upon the pins 26, tending to move the detent operator towards the right also, which movement is restrained, of course, as long as the plug is in its coupled position. As soon as the bore 39 registers with the balls however, and permits the balls to move outwardly, under the effect of the cam defined by the inclined surface 58 carried by the plug member, the combined effects of the springs 44 and 32 will tend to eject the plug member from the socket member.

Whereas no seals have been shown, it will be recognized by those skilled in the art that where the coupling is to be used for conducting fluids, seals can be introduced between any relatively movable parts where leakage might occur. Where the coupling is used for purposes other than the conduction of fluids, seals will ordinarily not be required.

Whereas the inventors have elected to show but one operative form of coupling for purposes of illustration, the invention should not be restricted to this particular form beyond the scope of the appended claims.

We claim:

1. A coupling comprising a socket forming member, a detent and a detent actuating sleeve carried by said member, a detent operator housed within said member, a sleeve displacing element carried by said operator, and a plug member received in said socket and retained therein by said detent, said plug member providing an abutment engageable with said operator when said members are coupled to actuate said detent.

2. A coupling comprising a socket forming member, a detent and a detent actuating sleeve carried by said member, a detent operator housed within said member, means biasing said operator in one direction, a sleeve displacing element carried by said operator, and a plug member received in said socket and retained therein by said detent, said plug member providing an abutment engageable with said operator to overcome said biasing means and advance said detent when said members are coupled.

3. A coupling comprising a socket forming member, a detent and a detent actuating sleeve carried by said member, a cam carried by said sleeve for engagement with said detent, a detent operator housed within said member, a sleeve displacing element carried by said operator, and a plug member received in said socket and retained therein by said detent, said plug member providing an abutment engageable with said operator when said members are coupled to actuate said detent.

4. A coupling comprising a socket forming member, a detent and a detent actuating sleeve carried by said member, an annular cam integral with said sleeve for engagement with said detent, a detent operator housed within said member, a sleeve displacing element carried by said operator, and a plug member received in said socket and retained therein by said detent, said plug member providing an abutment engageable with said operator when said members are coupled to actuate said detent.

5. A coupling comprising a socket forming member, a plurality of radially displaceable balls constituting a detent and a detent actuating sleeve carried by said member, a detent operator housed within said member, a sleeve displacing element carried by said operator, and a plug member received in said socket and retained therein by said detent, said plug member providing an abutment engageable with said operator when said members are coupled to actuate said detent.

6. A coupling comprising a socket forming member, a detent and a detent actuating sleeve carried by said member, a detent operator housed within said member, a sleeve displacing element carried by said operator, means biasing said operator towards a limiting position and said sleeve towards said detent, and a plug member received in said socket and retained therein by said detent, said plug member providing an abutment engageable with said operator when said members are coupled to actuate said detent.

7. A coupling comprising a socket forming member, a detent and a detent actuating sleeve carried by said member, a detent operator housed within said member, a sleeve displacing element carried by said operator, a spring interposed between said member and operator, a spring interposed between said sleeve and operator, and a plug member received in said socket and retained therein by said detent, said plug member providing an abutment engageable with said operator when said members are coupled to actuate said detent.

8. A coupling comprising a socket forming member, a detent and a detent actuating sleeve carried by said member, a detent operator housed within said member, a sleeve displacing element carried by said operator, concentric compression springs interposed between said operator and said member and sleeve respectively, and a plug member received in said socket and retained therein by said detent, said plug member providing an abutment engageable with said operator when said members are coupled to actuate said detent.

9. A coupling comprising a socket forming member, a detent and a detent actuating sleeve carried by said member, a detent operator housed within said member, a sleeve displacing element carried by said operator, and a plug member having a detent receiving recess received in said socket and retained therein by said detent, said plug member having a leading end providing an abutment engageable with said operator when said members are coupled to actuate said detent.

10. A coupling comprising a socket forming member, a detent and a detent actuating sleeve carried by said member, a detent operator housed within said member, a sleeve displacing element carried by said operator, and a plug member received in said socket and retained therein by said detent, said plug member providing an abutment engageable with said operator when said members are coupled to actuate said detent, said sleeve being movable towards said plug member to release said detent and eject said plug member from said socket member.

11. A snap coupling comprising a socket forming member, a detent and a detent actuating sleeve carried by said member, a detent operator housed within said member, a sleeve displacing element carried by said operator, a spring interposed between said operator and sleeve, and a plug member received in said socket and retained therein by said detent, said plug member having a detent receiving recess and providing an abutment engageable with said operator to compress said spring until said detent and recess register when said members are coupled.

12. A coupling comprising a socket forming member having a plug receiving end, a detent and a detent actuating sleeve carried by said member, a detent operator housed within said member in spaced relationship with respect to said end, a sleeve displacing element carried by said operator, and a plug member received in said socket and retained therein by said detent, said plug member providing an abutment engageable with said operator when said members are coupled to actuate said detent.

13. A coupling comprising a socket forming member, a detent and a reciprocable detent actuating sleeve carried by said member, a reciprocable detent operator housed within said member, a radially disposed sleeve displacing pin carried by said operator and projecting into the path of said sleeve, and a plug member received in said socket and retained therein by said detent, said plug member providing an abutment engageable with said operator when said members are coupled to actuate said detent through said pin.

14. A coupling comprising a socket forming member having a plug receiving end, a plurality of detent balls and a detent actuating sleeve carried by said member, a detent operator housed within said member, a spring biasing said operator towards said end, a sleeve displacing element carried by said operator and projecting radially through said member for engagement with said sleeve, and a plug member received in said socket and retained therein by said detent, said plug member providing an abutment engageable with said operator when said members are coupled to actuate said detent.

15. A coupling comprising a socket forming member, a detent and a detent actuating sleeve carried by said member, a detent operator housed within said member, a sleeve displacing element carried by said operator, and a plug member received in said socket and retained therein by said detent, said plug member providing a portion embracing said socket forming member and an abutment engageable with said operator when said members are coupled to actuate said detent.

16. A coupling comprising a socket forming member, a detent and a detent actuating sleeve carried by said member, a detent operator housed within said member, a sleeve displacing element carried by said operator, and a plug member received in said socket and retained therein by said detent, said plug member providing a skirt for reception of said socket forming member and providing an abutment engageable with said operator when said members are coupled to actuate said detent.

CLARENCE E. EARLE.
CARL A. COVINGTON.

No references cited.